Figure 1:
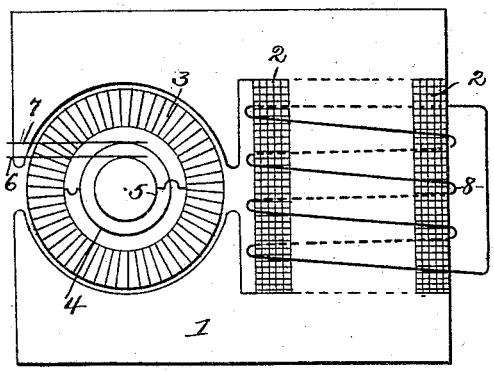

(No Model.) 2 Sheets—Sheet 1.

M. HUTIN & M. LEBLANC.
ALTERNATING CURRENT ELECTRODYNAMIC MACHINE.

No. 529,272. Patented Nov. 13, 1894.

Witnesses:
Jos. H. Blackwood
Albert B. Blackwood

Inventors,
Maurice Hutin and
Maurice Leblanc,
By Joseph Lyons
Attorney.

(No Model.) 2 Sheets—Sheet 2.

M. HUTIN & M. LEBLANC.
ALTERNATING CURRENT ELECTRODYNAMIC MACHINE.

No. 529,272. Patented Nov. 13, 1894.

Witnesses:
Jos. H. Blackwood
Albert B. Blackwood

Inventors,
Maurice Hutin and
Maurice Leblanc,
By Joseph Lyons.
Attorney.

UNITED STATES PATENT OFFICE.

MAURICE HUTIN, OF PARIS, AND MAURICE LEBLANC, OF LE RAINCY, ASSIGNORS TO THE SOCIÉTÉ ANONYME POUR LA TRANSMISSION DE LA FORCE PAR L' ÉLECTRICITÉ, OF PARIS, FRANCE.

ALTERNATING-CURRENT ELECTRODYNAMIC MACHINE.

SPECIFICATION forming part of Letters Patent No. 529,272, dated November 13, 1894.

Application filed August 20, 1892. Serial No. 443,565. (No model.) Patented in England July 28, 1892, No. 13,765.

*To all whom it may concern:*

Be it known that we, MAURICE HUTIN, engineer, of No. 46 Rue Caumartin, Paris, and MAURICE LEBLANC, engineer, of No. 63 Allee du Jardin Anglais, Le Raincy, Department of Seine and Oise, France, have invented certain new and useful Improvements in Alternate-Current Electrodynamic Machines, (for which we have received Letters Patent in England July 28, 1892, No. 13,765,) of which the following is a specification.

Our invention has for its object the method of and apparatus for synchronizing alternating current dynamo machines, and while the invention is particularly adapted for and useful in alternating current motors, it is also applicable to alternating current generators.

Alternating current motors are generally spoken of as synchronous motors, for the reason that they tend to rotate with a speed depending upon the number of alternations of the current passed through the same, and if the generating coils of the generator are equal in number to the coils of the motor, the latter will tend to rotate with the same speed as the generator. This tendency to synchronism, however, is opposed from moment to moment by the varying conditions under which the two machines, and particularly the motor, works.

Supposing for a moment that an alternating current motor of any description runs in absolute synchronism with the generator, and that the load of the motor is suddenly changed. If this load is increased the rotating part of the motor will necessarily be retarded, so that it will run for a certain time below synchronism. At such decreased speed, the machine, generating less counter electro-motive force will receive more current from the generator and will speed up and will attain a speed considerably above that of synchronism, at which increased speed it will receive less current than at synchronism and will again slow down and run below synchronism, but not quite so low as it did originally when the load was increased. This oscillation within wide limits between speeds below and speeds above synchronism will continue for a considerable time, until it will again become synchronous, provided that no further change in the conditions of its working occurs. These conditions, however, never remain constant in practice even for a short time. They change from moment to moment. The load increases and decreases continuously and for a great variety of reasons as is well known to those skilled in the art. The oscillations of speed of an alternating current motor therefor are always present, and they are gradual and of long duration.

It is the object of our invention to confine the oscillations of speed below and above synchronism within very narrow limits and to make them as few as possible, so that if for any cause whatever the machine runs either above or below synchronism it is very rapidly restored to a condition which approaches very nearly to synchronism. We accomplish this object by generating in the rotating part of the motor (generally the armature) a couple of forces which varies with the speed of the armature and which tends to accelerate the latter as soon as it lags behind synchronism and to retard it as soon as it passes above synchronism, and this couple of forces is generated by a circuit or circuits in the path of the magnetic flux between the armature and the field magnet, which circuit is not affected by the varying load of the machine, but merely by the varying speed of the same.

Figure 4:
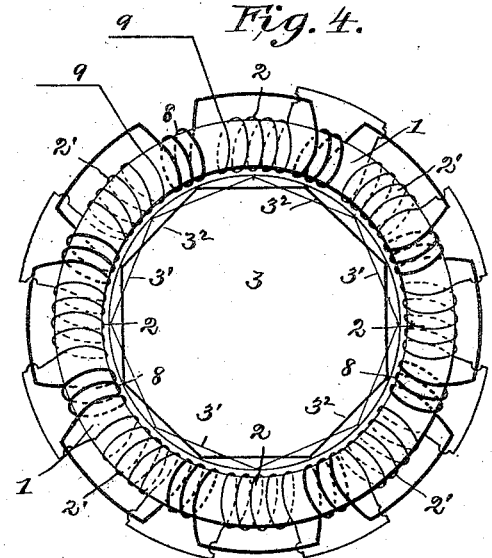
Figure 2:
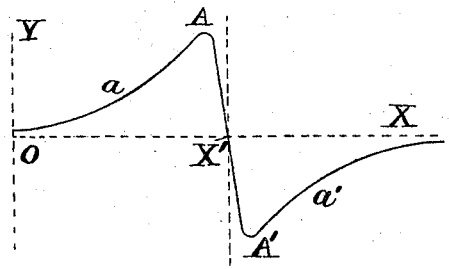
Figure 8:
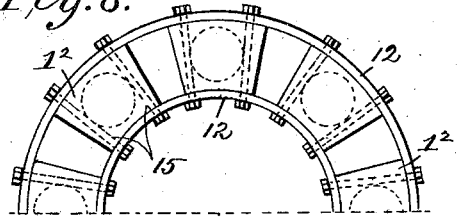
Figure 3:
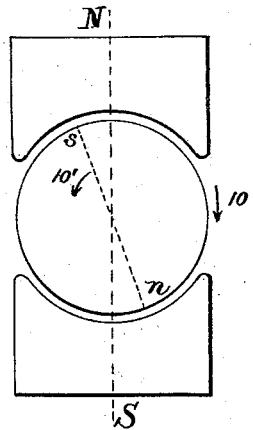
Figure 5:
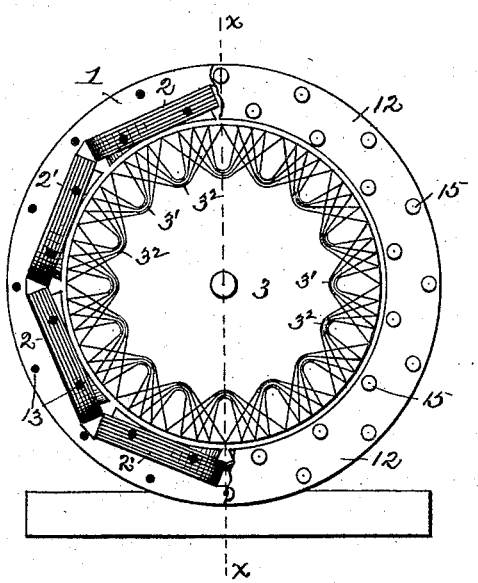
Figure 6:
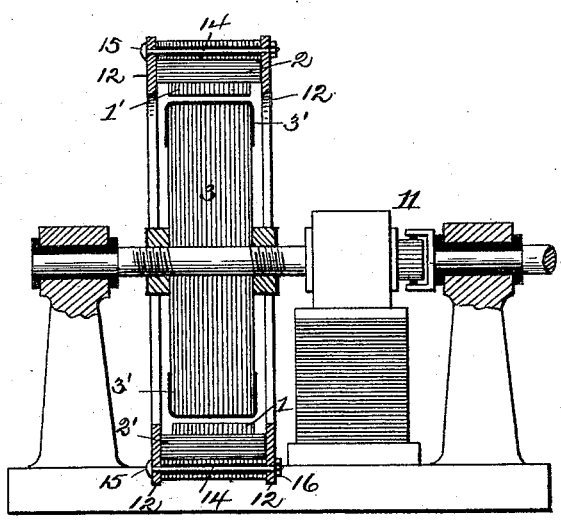
Figure 7:
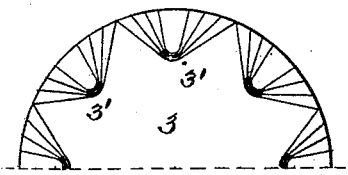

In the accompanying drawings which form a part of this specification we have shown in Figure 1, a diagrammatic representation of a monophase alternating current motor illustrating the principle of our invention; Fig. 2, a diagram illustrating the dependence of the deadening couple of forces upon the speed of the machine; Fig. 3, a diagram illustrating the mode of operation of an ordinary two-phase alternating current motor; Fig. 4, a diagram of our invention as applied to a two-phase alternating current motor; Fig. 5, an end view of a two-phase alternating current machine embodying our invention, with parts broken away; Fig. 6, a central longitudinal section on the line $x$—$x$ of Fig. 5, partly in elevation; Fig. 7, a diagram illustrating an armature of a mono-phase machine having the same kind of winding as that shown in Figs. 5 and 6; Fig. 8, an end view of a portion of the field magnets of a different kind of alternating current motor to which our invention may be applied, and Fig. 9, a section of the same.

The principle of the invention may be explained with reference to Figs. 1 and 2. In Fig. 1, the field magnet 1, has an energizing coil 2, through which a continuous current is passed either from a battery or a small continuous current dynamo, whereby the normal excitation of the field magnet is rendered constant. The armature 3, may be of the Gramme type, and on diametrically opposite sides it is connected with the collector disks or rings 4, 5, as shown, and upon these collector disks bear the brushes 6, 7, by means of which alternating currents are passed through the armature. A machine constructed as thus far described would run synchronously with a two pole alternating current generator if the conditions of working could be maintained absolutely uniform. That this cannot be done in practice is well known, and consequently the armature will run with varying speeds within wide limits below and above synchronism. There will be a pendulous slow and long continued oscillation of speed whenever the conditions of working are varied ever so slightly. In order to overcome this great amplitude and long continued oscillation of speed, we provide a circuit in the path of the magnetic flux between the armature and field magnet, whereby currents are generated in the said circuit and which currents reacting upon the armature will produce at the circumference of the same a couple of forces, the intensity and direction of which are dependent upon the speed of the armature. Such a circuit is represented at 8, and it is here shown as a coil superimposed upon the field magnet winding and closed upon itself. The location of this coil shown in Fig. 1, is by no means favorable for the accomplishment of the purpose of our invention, and it is only shown at that location for the sake of ease of illustration and explanation. The magnetic flux which we may conceive as starting from and returning to the armature through the field magnet evidently crosses the circuit 8, which is thus under the influence, although imperfectly so, of the magnetic flux. Now we have found from theoretical consideration, verified in practice, that the presence of such circuit in the path of the magnetic flux gives rise on the armature of a couple of forces, the dependence of which upon the speed of the armature is illustrated graphically in Fig. 2. In this figure of drawings O X, O Y, is a system of co-ordinates, the abscissa of which represents speeds of the armature and the ordinates of which represent the corresponding intensities and directions of the resulting couple of forces acting on the armature. The abscissa between O and X', represents speeds below synchronism, and O X', the speed at synchronism. Consequently the speeds measured on the abscissa to the right of X' are those above synchronism. We have found that under these circumstances the characteristic of the couple of forces produced by the circuit 8, is represented by the curve $a\,a'$. A contemplation of this curve will show that as the speed of the armature increases from zero toward synchronism, the intensity of the couple of forces increases gradually and attains a maximum at A, when the speed is still below but very near synchronism; also that from that point the couple diminishes and becomes zero at synchronism; also that as the speed increases above synchronism, the couple becomes negative and increases rapidly toward a new maximum $A'$, and then again gradually decreases with the further increasing speed of the armature. The same theoretical considerations, also verified in practice, show that the lower the resistance of the closed circuit in question and the more completely it receives the magnetic flux, the nearer will be the maxima $A\,A'$, of the characteristic $a\,a'$, to the ordinate erected at the point $X'$ of the abscissa, which point corresponds to the speed of synchronism. It follows from this, that in a machine of the kind described, when the armature runs with a speed slightly below synchronism the couple of forces produced upon the armature by the circuit 8, will tend powerfully to accelerate the armature toward synchronism; and when the speed of the armature is slightly greater than that corresponding to synchronism, the couple of forces will powerfully tend to retard the armature toward synchronism. The circuit 8, therefore, has the effect of a dash-pot upon the oscillations of speed of the armature; it dampens or deadens these oscillations and tends to maintain the armature at a speed very near synchronism. For this reason we have given to that circuit the name of "deadening circuit" and it will hereinafter be referred to by that name.

From the foregoing it will be seen at once that the particular arrangement of the deadening circuit illustrated in Fig. 1, is not very favorable for the accomplishment of the results sought, since a coil even of heavy wire, does not furnish a circuit of very low resistance, and since in the location in which the coil is shown in Fig. 1, it is at a considerable distance from the inter-polar space. Theoretically, the deadening circuit would be the most effective if it were formed of a tube of copper, concentric with the armature, and located in the interpolar space between the armature and the field magnet poles; for with such construction the deadening circuit would have the lowest resistance and would be crossed by the whole magnetic flux. But such construction would have the disadvantage of separating the surfaces of the armature unduly from the surfaces of the field magnet poles, which would reduce the power of the motor to a degree inadmissible for practical purposes, and we shall hereinafter point out a construction which renders the deadening circuit efficient without enlarging the interpolar space.

In Fig. 4, is illustrated, mainly in diagram, a two-phase alternating current motor provided with our invention. In this case the field magnet core 1, is a ring, ordinarily laminated, and is energized by a continuous current passing by the terminals 9, 9, through the coils 2, 2′ wound upon the core in sections which are properly spaced, as shown. These coils are here shown in series, and each succeeding coil is wound oppositely to the preceding coil whereby a number of consequent poles are produced in the core. In the spaces between the energizing coils are wound the deadening coils 8 of very low resistance, and are here shown all in a single series which is closed upon itself like the winding of a Gramme ring. The armature 3, has two overlapping windings, which in the diagram are represented by the lines 3′ 3², and through each of which an alternating current is passed, but so that there is a difference of phase between the two currents. In this manner as is well known, there are produced in the armature a number of polar lines, which rotate oppositely to and with the same speed as the armature, when the latter rotates synchronously with the generator, so that the polar lines are stationary in space.

Fig. 3, represents this diagrammatically with reference to two poles of the field magnet and two poles of the armature. To each polar line N S of the field magnet corresponds a polar line s n of the armature. It forms an angle with the former, and when the armature rotates in the direction of the arrow 10, with the velocity corresponding to synchronism, then the polar line s n turns with the same speed in the direction of the arrow 10′, so that the polar line s n, is fixed in space.

The function of the deadening circuit in a two-phase machine, or generally in a multiphase machine, is precisely the same as that in a single phase machine, as will now be readily understood.

In Figs. 5 and 6, the preferred form of the deadening circuit is illustrated with reference to a multi-polar two-phase machine. In this case the armature core 3, made as a laminated disk, has two sets of overlapping windings 3′ 3², and surrounding the armature is the field magnet ring 1, also laminated as shown, with the energizing coils 2 2′, on the radial pole pieces, the inner faces of which conform in the aggregate to a circle concentric with the armature. The field magnets are energized by a continuous current, which may be derived from a continuous current dynamo 11, which, if the machine is used as a generator, may be driven from the same shaft as the alternating current machine. The field magnets, however, may be energized from any other source of continuous current.

The deadening circuit is formed by two non-magnetic rings or cheeks 12, 12, of low resistance, made preferably of bronze or of copper, one on each side of the field magnet ring and entirely covering the two faces of the latter and particularly covering the sides of the radial pole pieces as shown. Through the body of the field magnet with its pole pieces, parallel to the axis of the machine, are formed the perforations 13, in two concentric rows, as shown in Fig. 5, and through these perforations and through corresponding perforations in the rings or cheeks 12, pass insulated copper rods 14, in electrical connection at their ends with the cheeks or rings 12, either by riveting or by a head 15, at one end and a nut 16 at the other end. The inner row of perforations 13, is as close as practicable to the concave faces of the polar projections. By this construction the deadening circuits are placed very close to the outer margin of the interpolar space and the circuits are intersected by the variations of magnetic flux emanating from the armature. They are moreover of exceedingly low resistance so that they fulfill all the conditions of prompt and energetic action above set forth.

Machines constructed in this manner may be run for an indefinite time under varying conditions of work with practical synchronism, the deviations from synchronism being so slight and of such short duration as to be hardly noticeable. By actual work we have found that these two-phase alternating current motors, starting with the admission of current to the armature, run up very rapidly to synchronism and remain there without appreciable deviation from that speed. When the armature of a machine of this kind receives a single-phase alternating current, in which case it is wound, as shown in Fig. 7, it will not start by itself, but must be started by hand or otherwise, and is run up near and preferably above synchronism, after which the action of the deadening circuit will keep it practically at synchronism.

Whatever the form of the machine may be the deadening circuit must always be of very low resistance and so located as to be intersected by the magnetic flux. This will require a different arrangement or location of the deadening circuit for different machines.

Figure 9:
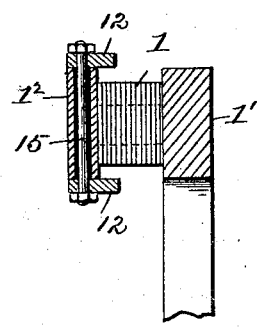

In Figs. 8 and 9, the arrangement of the deadening circuit, in a different type of machine from those hereinbefore considered, is indicated. Here the field magnets 1, are either mounted upon or constitute a part of a ring 1′ projecting laterally therefrom, and having segmental polar extensions 1² which are understood to face a rotating armature. The rings or cheeks 12 12 are in this case applied to the inner and outer edges of the segmental pole pieces, and the copper rods or bolts 14, are passed through these pole pieces.

The deadening circuit is particularly useful when the machines are used as motors, but it is also useful for generators when two or more of them are coupled for quantity since in that case it is important that all the generators be run synchronously in order that none of them be short circuited by the others.

In addition to its function as a synchronizer the deadening circuit also operates in alternating current machines with constant field to suppress the generation of Foucault currents. It also suppresses the parasitic currents which would otherwise be generated in the field circuit by the reaction upon the same of the alternating currents in the armature.

Having now fully described our invention, we claim and desire to secure by Letters Patent—

1. The method of maintaining the speed of synchronism in alternating current motors or generators, which consists in counterbalancing the variations of the speed of the same by a couple or couples of forces operating upon the rotating element of the motor in opposition to the variations, and produced by independent currents generated by and in accordance with said variations, substantially as described.

2. The method of maintaining the speed of synchronism in alternating current motors or generators, which consists in generating independent currents by and in accordance with the variations from synchronism, and thereby producing upon the rotating element a couple or couples of forces opposed to said variations, substantially as described.

3. In an alternating current motor, the combination of a field magnet or magnets having constant polarity, and an armature charged with alternating currents from an extraneous source, with an independent, closed circuit or circuits of low resistance, in the path of the magnetic flux of the machine, for maintaining the speed of synchronism, substantially as described.

4. In an alternating current motor, the combination of a field magnet or magnets having constant polarity, and an armature charged with alternating currents from an extraneous source, with a deadening circuit or circuits for counteracting the tendency of variations from synchronism, consisting of paths of low electrical resistance located within the path of the magnetic flux of the machine, at the margin of the interpolar space, substantially as described.

5. An alternating current motor or generator having field magnets in which the magnetism is constant, and provided with a deadening circuit or circuits for maintaining the speed of synchronism consisting of two metallic rings of low resistance, one on each side of the field magnet poles and electrically joined by cross connections of low resistance insulated from the pole pieces, substantially as described.

6. An alternating current motor or generator having field magnets in which the magnetism is constant, and provided with a deadening circuit or circuits for maintaining the speed of synchronism, the same consisting of two metallic rings, one on each side of the field magnet poles and joined by metal rods passing through perforations in the pole pieces, but insulated therefrom, substantially as described.

In witness whereof we have hereunto signed our names in the presence of two subscribing witnesses.

MAURICE HUTIN.
MAURICE LEBLANC.

Witnesses:
ROBT. M. HOOPER,
CHARLES MARDELES.